United States Patent [19]

Bassine

[11] Patent Number: 5,166,563
[45] Date of Patent: Nov. 24, 1992

[54] MAGNETICALLY ACTUATED LINEAR DISPLACEMENT COMPRESSOR

[76] Inventor: Stuart Bassine, 1800 Marina Cir., North Fort Myers, Fla. 33903

[21] Appl. No.: 487,386

[22] Filed: Mar. 2, 1990

[51] Int. Cl.[5] .................. H02K 33/12; F04B 17/04; F04B 35/04; A62B 7/00
[52] U.S. Cl. ........................ 310/15; 310/17; 417/417; 55/75; 128/205.18
[58] Field of Search ............. 310/15, 17, 27; 417/417, 418; 55/75; 128/204.21, 205.18

[56] References Cited

U.S. PATENT DOCUMENTS

| | | | |
|---|---|---|---|
| 461,295 | 10/1891 | Van Depoele | 417/418 |
| 1,684,468 | 8/1926 | Brown | 417/418 |
| 1,783,611 | 12/1930 | Gohring | 417/418 |
| 2,515,110 | 5/1949 | Bornstein | 417/418 |
| 2,690,128 | 9/1954 | Basilewsky | 417/418 |
| 3,422,765 | 1/1969 | Schoch | 417/418 |
| 3,740,171 | 6/1973 | Farkos | 417/418 |
| 3,754,154 | 8/1973 | Massie | 310/17 |
| 3,863,082 | 1/1975 | Gillott et al. | 310/27 |
| 4,163,911 | 8/1979 | Simes et al. | 310/27 |
| 4,215,681 | 8/1980 | Zalkin et al. | 128/204.21 |
| 4,612,467 | 9/1986 | Clegg | 310/27 |
| 4,648,888 | 3/1987 | Rowland | 55/75 |
| 4,726,366 | 2/1988 | Apple et al. | 128/204.21 |
| 4,787,823 | 11/1988 | Hultman | 417/45 |
| 4,813,979 | 3/1989 | Miller et al. | 55/75 |
| 4,965,864 | 10/1990 | Roth et al. | 318/135 |

FOREIGN PATENT DOCUMENTS

| | | | |
|---|---|---|---|
| 3046048 | 8/1982 | Fed. Rep. of Germany | 417/418 |
| 547566 | 12/1922 | France | 417/418 |

Primary Examiner—R. Skudy
Assistant Examiner—D. R. Haszko
Attorney, Agent, or Firm—William E. Noonan

[57] ABSTRACT

A magnetically actuated linear displacement compressor for use in an oxygen concentrator is provided, including a cylinder and a diaphragm mounted for reciprocating movement in the cylinder. The diaphragm divides the cylinder into two longitudinal portions and includes a permanent magnet and a peripheral edge that sealably engages the inside surface of the cylinder. Gas is introduced into and discharged from each of the cylinder portions. There is a linear actuator that includes a series of windings arranged along the cylinder. Successive groups of at least one of the windings are selectively energized and de-energized in a reciprocating pattern to generate a reciprocating magnetic field which drives the diaphragm reciprocally through the cylinder such that gas is alternately drawn into and discharged from one cylinder portion while the reverse sequence occurs in the other cylinder portion.

13 Claims, 3 Drawing Sheets

5,166,563

MAGNETICALLY ACTUATED LINEAR DISPLACEMENT COMPRESSOR

FIELD OF INVENTION

This invention relates to a magnetically actuated linear displacement compressor and, more particularly, to an oxygen concentrator apparatus that utilizes such a compressor.

BACKGROUND OF INVENTION

Conventional pumps or compressors, particularly those which are employed in oxygen concentrators, exhibit a number of disadvantages. These pumps tend to be relatively large, heavy, noisy and inefficient. For example, a typically rotary compressor requires a rotor and other parts which add to the complexity, weight, noise and expense of the system. An unwieldy pump presents a particular problem for patients who require a concentrator because it severely limits the patient's mobility. Known oxygen concentrator compressors also typically require a 60 cycle alternating current power supply which may not be available in many countries. Moreover, the speed required by a conventional pump uses undesirable amounts of electricity and generates undesirably large amounts of heat. And, there is a certain degree of risk presented from potential sparks around high concentrations of oxygen. Conventional concentrators also require relatively complicated timing and valve connections, thereby further increasing their expense and their risk of malfunction.

A number of linear electromagnetic pumps are known for use in the respirator art. However, these devices still do not provide optimal efficiency. Virtually all require fairly sophisticated electromagnetic drives. Certain of these devices also require springs, cranks, crank arms and bobbins to develop compression. Such structure adds to the weight, complexity and unreliability of these systems. Moreover, excessive heat generation and electrical inefficiency again tend to be problems.

SUMMARY OF INVENTION

It is therefore an object of the present invention to provide a magnetically actuated displacement compressor that pumps large volumes of gas in a highly efficient manner.

It is a further object of this invention to provide such a compressor which is relatively light weight, compact and quiet and which is conveniently portable and operable by a 12 volt DC power supply.

It is a further object of this invention to provide such a compressor which generates a minimal amount of heat and electricity and which operates effectively on battery power.

It is a further object of this invention to provide a compressor which pumps a volume of gas that may be closely and precisely controlled.

It is a further object of this invention to provide a compressor which is highly effective for use in an oxygen concentrator apparatus and which simplifies considerably the structure and operation of such an apparatus.

This invention results from the realization that large volumes of oxygen or other gases may be pumped rapidly and efficiently by a compressor that employs a permanent magnet diaphragm or piston which is driven reciprocally through a cylinder by a linear magnetic actuator. Such an apparatus requires relatively few moving parts, does not generate excessive heat and is lightweight and readily transportable.

This invention features a magnetically actuated linear displacement compressor that includes a cylinder and a diaphragm mounted for reciprocating movement in the cylinder. The diaphragm divides the cylinder into two longitudinal portions and includes a permanent magnet and means defining a peripheral edge that sealably engages the inside surface of the cylinder. There are means for introducing gas into and discharging gas from each of the cylinder portions. Linear actuator means are provided for driving the compressor. These include a series of windings arranged along the cylinder and means for selectively energizing and de-energizing successive groups of at least one of the windings in a reciprocating pattern. This generates a reciprocating magnetic field which drives the diaphragm reciprocally through the cylinder such that gas is alternatively drawn into and discharged from one of the cylinder portions while the reverse sequence occurs in the other cylinder portion.

In a preferred embodiment each winding is disposed peripherally about the cylinder. Each winding may include first and second winding segments. The first winding segment has a first polarity and the second winding segment has an opposite second polarity. The first and second segments may generally conform to the shape of the cylinder. Additionally, the first and second segments are preferably offset longitudinally along the cylinder.

The permanent magnet may include an outer portion that has the first polarity and an inner portion that has the second polarity. It may also include an annular shape. The diaphragm and the cylinder may include complementary circular cross sectional configurations.

Alternatively, the windings may be arranged generally perpendicularly relative to the longitudinal axis of the cylinder. In such cases, the diaphragm and the cylinder may include complementary oblong shapes. A permanent magnet may include a first side having a first polarity and an opposite second side portion having an opposite second polarity.

This invention further features an oxygen concentrator that employs a compressor as described above. The concentrator also includes first and second nitrogen filters, also known in the art as molecular sieves, having respective air inlets. The means for introducing and discharging may include first means for communicably connecting the first cylinder portion with the first filter and second means for communicably connecting the second cylinder portion with the second filter. As the reciprocating magnetic field draws the diaphragm reciprocally through the cylinder, concentrated oxygen is alternately drawn from its associated filter into one of the cylinder portions and then discharged from the cylinder portion. Contemporaneously, the reverse sequence occurs in the other cylinder portion. Means may be provided for directing at least a portion of the discharged oxygen to a patient. Each nitrogen filter or molecular sieve may also include exhaust means and the means for directing may include means for reintroducing a portion of the discharged oxygen into its associated filter to purge filtered nitrogen through the exhaust means.

BRIEF DESCRIPTION OF THE DRAWINGS

Other objects, features and advantages will occur from the following description of preferred embodiments and the accompanying drawings in which.

DETAILED DESCRIPTION OF PREFERRED EMBODIMENTS

Figure 1:
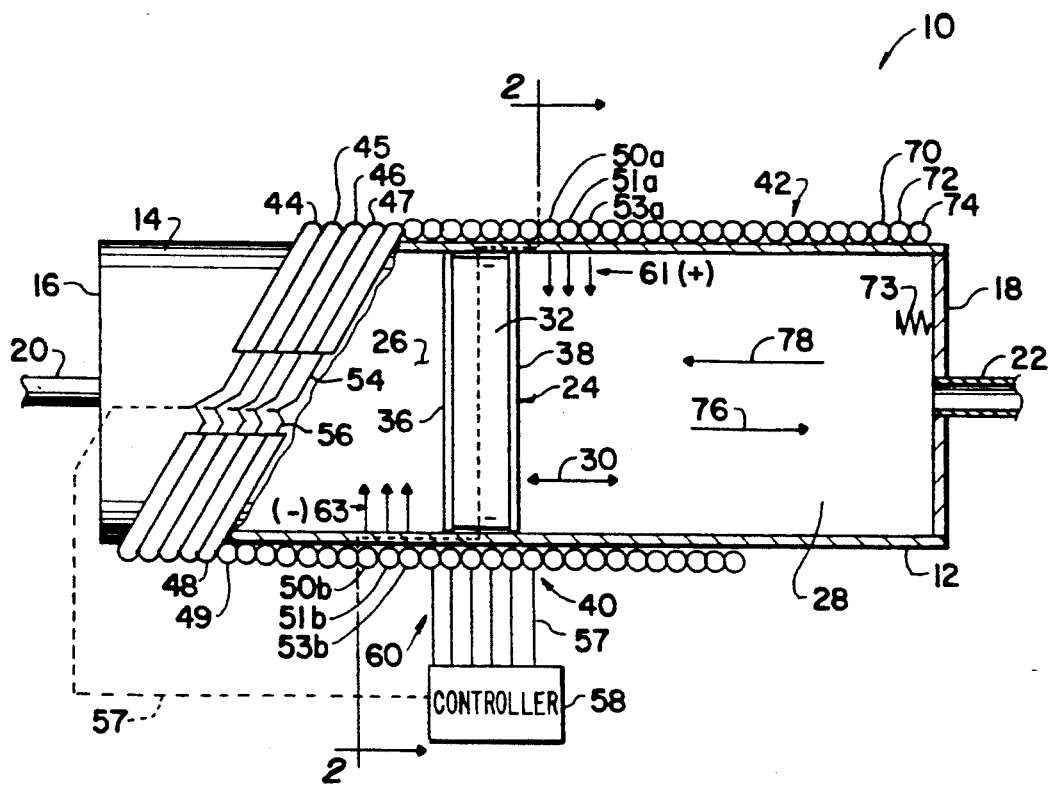
FIG. 1 is a simplified, elevational, partly cut away view of a magnetically actuated linear displacement compressor according to this invention.
Figure 2:
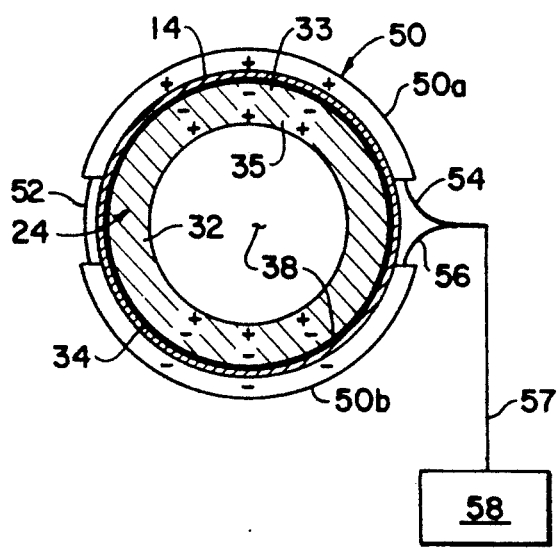
FIG. 2 is a cross sectional view taken along line 2—2 of FIG. 1, wherein several of the upper windings are omitted for clarity.

There is shown in FIG. 1 a magnetically actuated linear displacement compressor 10 that includes an elongate cylinder 12. The cylinder includes a longitudinal wall 14 that has a generally circular cross section, as best shown in FIG. 2. Walls 16 and 18, FIG. 1, are formed at the respective ends of cylinder 12. A first inlet/outlet port 20 is formed in end wall 16. A second such port 22 is formed through end wall 18. Ports 20 and 22 permit gas to be introduced into and discharged from the interior chamber of cylinder 12 during the pumping action described more fully below.

A diaphragm 24 is mounted in the chamber of cylinder 12. Diaphragm 24 divides cylinder 12 into a left hand portion 26 and a right hand portion 28. The diaphragm is mounted so that it is reciprocally moveable in the direction of double headed arrow 30 within cylinder 12.

Figure 3:
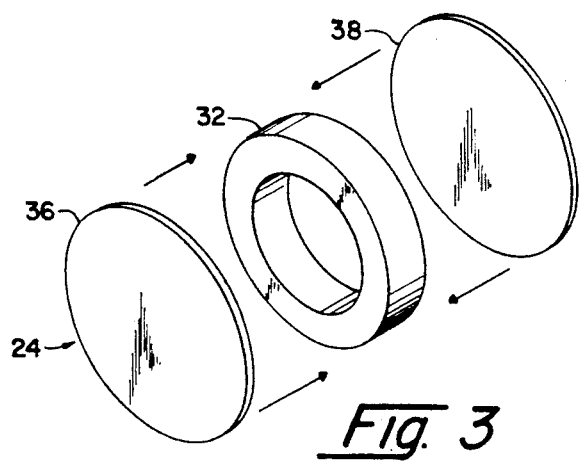
FIG. 3 is an exploded view of the diaphragm.

As shown more clearly in FIG. 2, diaphragm 24 has a generally circular cross section which conforms with the cross sectional shape of cylinder wall 14. The diaphragm includes an annular permanent magnet 32 and a peripheral edge 34 that sealably engages the inner surface of cylinder wall 14. Permanent magnet 32, FIG. 3, is typically interposed and sealed in a known manner between circular elements 36 and 38, which are composed of Teflon (TM) or a similar low or non-stick material. Elements 36 and 38 have a diameter which is slightly larger than that of permanent magnet 32. As a result, the circumferential edges of elements 36 and 38 sealably engage the inner wall of the cylinder. The material that composes elements 36 and 38 should be slidable across the inner surface of the cylinder so that the diaphragm moves freely back and forth in the cylinder. At the same time, the circumferential edges of elements 36 and 38 must provide a secure seal so that appropriate vacuum and pressure may be maintained in the portions 26 and 28 of cylinder 12. Permanent magnet 32 has a negative polarity along its outer edge 33 and a positive polarity along its inner edge 35. In alternative embodiments these polarities may be reversed.

Diaphragm 24 is driven within cylinder 12 by a linear actuator 40. More particularly, the linear actuator includes a series of windings 42 that are wound about cylinder wall 14. In cylinders having a circular cross sectional shape, such as shown in FIGS. 1 and 2, the windings 42 are typically offset, as best shown by windings 44, 45, 46, 47 and 48 at the left hand side of the apparatus. As represented by winding 50 in FIG. 2, each winding includes an upper segment 50a and a lower segment 50b which conform to the peripheral shape of wall 14. Segments 50a and 50b are interconnected by a wire 52 and are connected to a programmable controller 58 by respective wires 54 and 56. Although the arrangement is shown only for winding 50 in FIG. 2, it should be understood that a similar construction is preferably utilized for each of the windings in this invention. In FIG. 1, the individual wires 54 and 56 are shown only for windings 44 through 48. Phantom line 57 represents the lead which connects these wires to the controller. Similar leads represented generally by 60 in FIG. 1, interconnect the controller and the remaining windings in a like manner.

Controller 58 may be programmed in a known manner to selectively and sequentially energize and de-energize windings 42. For example, the controller may first energize winding 44. Subsequently, it may energize winding 45 while de-energizing winding 44. After that, winding 46 is energized and winding 45 is de-energized; and so on longitudinally through the length of cylinder 12. Alternatively, groups of two or more windings may be simultaneously energized and then de-energized. For example, initially windings 44, 45 and 46 may be energized together. Then, windings 47, 48 and 49 may be energized as a group, while windings 44, 45 and 46 are de-energized. The controller continues energizing and de-energizing groups of windings according to such patterns until the windings 70, 72 and 74 at the right hand end of cylinder 12, are energized. Then, the controller reverses the process and the windings 42 are sequentially energized and de-energized from right to left.

As each winding is energized, its upper and lower segments generate magnetic fields, such as indicated by arrows 61 and 63 in FIG. 1. For example, in FIG. 1 the upper segment of each winding generates a positive field and the lower segment generates a negative field. As the windings 42 are sequentially energized and de-energized in groups of three from left to right in the direction of arrow 76, the magnetic fields travel in a similar direction from left to right within the cylinder. When the pattern of energization reverses, the controller reverses the polarities of the magnetic fields and they travel in the direction of arrow 78 from right to left within the cylinder.

Because the upper segment of each winding is offset from the lower segment, as shown in FIG. 1, the upper positive field 61 leads the negative lower field 63 as they travel through cylinder 12. Positive field 61 attracts the negative outer rim of permanent magnet 32. At the same time, negative field 63 repels the negative outer rim of permanent magnet 32. As a result, magnet 32 is both pulled by field 61 and pushed by field 63 so that the magnet is driven in the direction of arrow 76. Windings 50, 51 and 53 are shown driving the diaphragm in FIG. 1. As the group of windings 50, 51 and 53 are de-energized, the next three windings to the right are energized so that the permanent magnet 32 continues to be driven in a similar manner in the direction of arrow 76. When diaphragm 24 finally reaches the right hand end of cylinder 12, it engages a spring 73 on wall 18. At the same time, the pattern of energization reverses. The controller reverses the polarity of the winding segments and, as a result, the polarity of the upper and lower magnetic fields is reversed. This causes the diaphragm to be driven in a manner such as described above, in the direction of arrow 78. Now, however, upper field 61 pushes the diaphragm and lower field 63 pulls the diaphragm. Diaphragm 24 thus travels from right to left until it reaches wall 20. The fields are then reversed again and the pattern is repeated. The windings are continuously energized and de-energized in this reciprocating sequential manner so that the traveling magnetic field drives magnet 32, and therefore diaphragm 24, reciprocally within the cylinder as indicated by double headed arrow 30.

As diaphragm 24 travels in the direction of arrow 76, the volume of cylinder portion 28 decreases. As a result, the gas within portion 28 is compressed and pumped out through port 22. At the same time, the volume of cylinder portion 26 increases. This creates a vacuum within portion 26 which draws gas into the cylinder through port 20. When the diaphragm reverses direction, the reverse process occurs. Gas is compressed in portion 26 and pumped out through port 20; while a vacuum is created in portion 28 and as a result, gas is drawn in through port 22. The polarities of the windings and magnetic diaphragm may be reversed within the scope of this invention.

Figure 4:
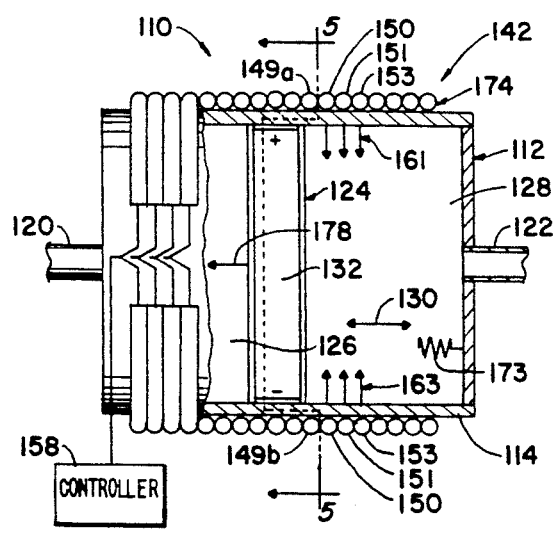
FIG. 4 is a simplified, elevational, partially cut away view of an alternative compressor that employs an oblong cylinder.
Figure 5:
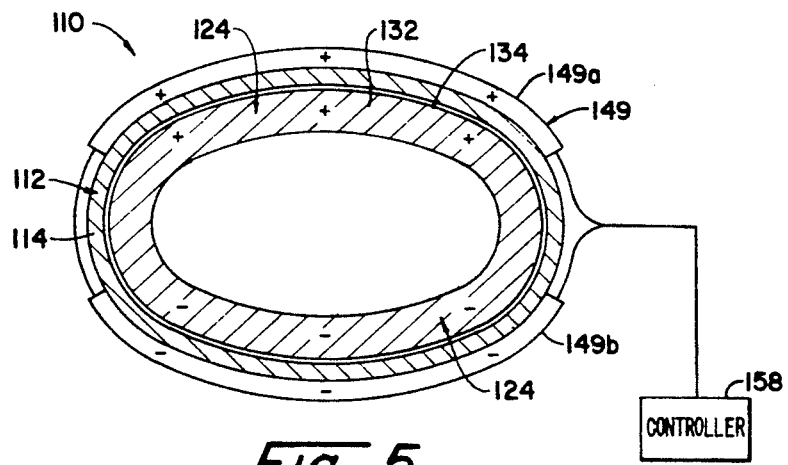
FIG. 5 is a cross sectional view taken generally along line 5—5 of FIG. 4.

An alternative compressor 110, shown in FIGS. 4 and 5, features a cylinder 112 that has a generally oblong, circumferential wall 114. Likewise, the compressor employs a diaphragm 124 that has an oblong, cross sectional shape. Oblong diaphragm 124 includes a ring-like permanent magnet 132 and a peripheral sealing edge 134, which slidably engages the inner surface of oblong cylinder 112 to divide cylinder 112 into portions 126 and 128. Diaphragm 124 may be formed, in a manner similar to the prior embodiment, by a pair of layers of teflon or similar material superposed on either side of magnet 132. In this embodiment, permanent magnet 132 exhibits a positive polarity in the upper portion of the magnet and a negative polarity in the lower portion of the magnet. Again, the diaphragm is mounted to move longitudinally within cylinder 112 in the direction indicated by double headed arrow 130, FIG. 4.

A series of windings 142, FIG. 4, are wound about cylinder 112 generally perpendicularly relative to the cylinder. Otherwise the construction of the windings is analogous to the previous embodiment. Each of the windings generally conforms to the outer peripheral shape of the cylinder and therefore has a generally oblong configuration, as best exhibited in FIG. 5. As represented by winding 149 therein, a controller 158 selectively energizes each winding such that the upper segment 149a is positively charged and the lower segment 149b is negatively charged. Groups of, for example, three such windings may be sequentially energized, as shown by windings 150, 151 and 153 in FIG. 4, so that a positive inwardly directed magnetic field 161 is generated along the upper portion of cylinder 112 and an opposing, inwardly facing negative field 163 is generated along the lower portion of the cylinder. As previously described, the windings 142 are actuated sequentially in a reciprocating pattern so that magnetic fields 161 and 163 travel longitudinally through cylinder 112, as indicated by double-headed arrow 130. Positive field 161 repels the positive upper portion of magnet 132 and, similarly, negative field 163 repels the negative lower portion of magnet 132. This causes the magnetic fields to drive magnet 132 in the direction of arrow 178. Magnet 132, and therefore diaphragm 124, is pushed in this manner by the reciprocating fields back and forth through the cylinder. As the diaphragm 124 reaches each end of cylinder 112, it engages a spring 173 which assists the diaphragm in reversing direction. The reciprocating motion of the diaphragm causes a continuous vacuum and pressure to be generated within the cylinder through ports 120 and 122. Each of the portions 126 and 128 is alternatively pressurized and evacuated.

By employing an oblong cross-sectional shape, the embodiment of FIGS. 4 and 5 prevents the diaphragm 124 from rotating within cylinder 112 such that the opposing fields of the windings 142 and the permanent magnet 132 would align. Such a result could greatly interfere with operation of the compressor.

Figure 6:
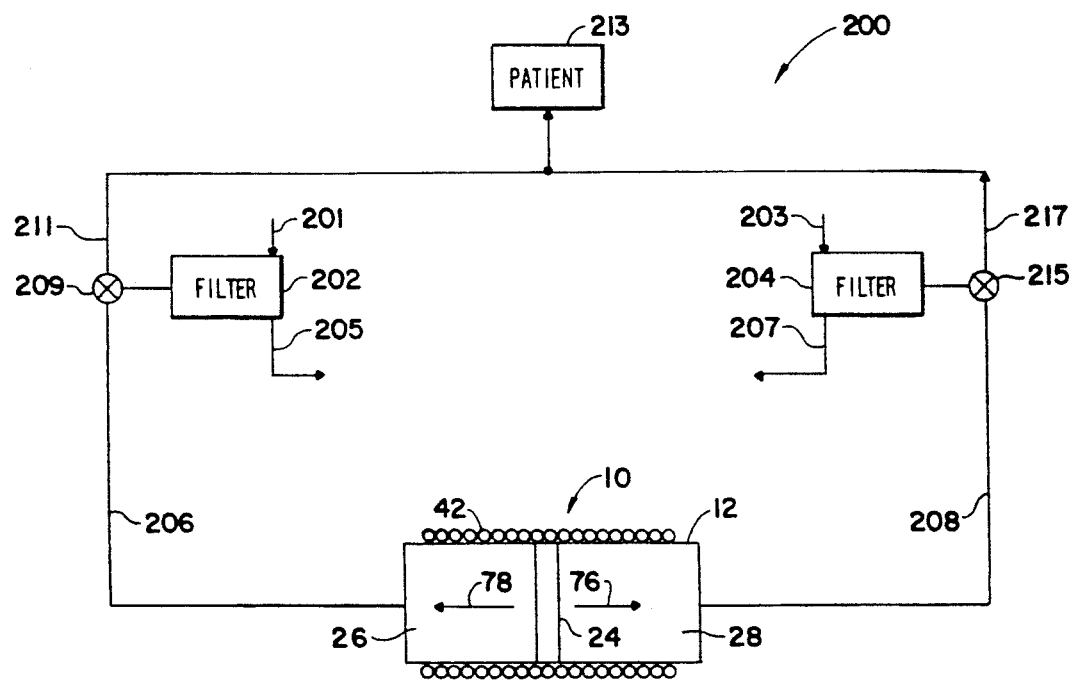
FIG. 6 is a schematic of an oxygen concentrator that employs the compressor of this invention.

As shown in FIG. 6, compressor 10 of this invention (and analogously compressor 110) may be employed in an oxygen concentrator system 200. This system also includes a pair of nitrogen filters 202 and 204 which are connected, respectively, to sections 26 and 28 of cylinder 12. More particularly, a first conduit 206 connects portion 26 to filter 202 and permits an exchange of gas therebetween. A second conduit 208 communicably connects cylinder portion 28 and filter 204. Conduit 206 is connected to cylinder portion 26 through port 20, FIG. 1, and conduit 208 is similarly connected to portion 28 through port 22. Filter 202 includes an air inlet 201 and filter 204 includes a similar air inlet 203. In addition, the filters 202 and 204 include respective exhaust outlets 205 and 207. Each of the filters 202 and 204 typically comprises a conventional sieve bed used in the oxygen concentrator art.

In operation, windings 42, FIG. 6, are sequentially energized, as described above, so that the generated magnetic fields drive diaphragm 24 reciprocally through cylinder 12 in the direction of arrows 78 and 76. As the diaphragm is driven in the direction of arrow 76, a vacuum is created in cylinder portion 26. This causes air to be drawn into filter 202 through inlet 201. The nitrogen in the air is largely removed by filter 202 such that the concentration of oxygen is increased from approximately 21%, as is normally present in the air, to 95% or higher. This concentrated oxygen is drawn via conduit 206 into the vacuum in portion 26 of cylinder 12. When diaphragm 24 reaches the right hand end of cylinder 12, it reverses direction and is driven in the direction of arrow 78. This causes the concentrated oxygen in portion 26 to be compressed and pumped out of cylinder 12 through conduit 206. A valve 209 directs a portion of this pumped concentrated oxygen through a line 211 to a patient 213 who is in need of oxygen. Valve 209 directs the remainder of the concentrated oxygen back into filter 202. This oxygen purges the nitrogen which has been previously removed by the filter and the purged gas is released through exhaust valve 205. A one-way valve prevents this purged gas from being emitted through air inlet 201.

While the concentrated oxygen in portion 26 is being pumped out of the cylinder in the manner described above, a vacuum is created in the right hand portion 28 of cylinder 12. This causes air to be drawn through inlet 203 into filter 204. This filter largely removes the nitrogen in the air so that concentrated oxygen is delivered through conduit 208 to portion 28 of cylinder 12. When diaphragm 24 reaches the left hand end of cylinder 12, it again reverses direction, as indicated by arrow 76. The diaphragm is then driven again from left to right so that the concentrated oxygen in portion 28 is pumped out of the cylinder through line 208. Again, a portion of this concentrated oxygen is directed by a valve 215 through a line 217 to patient 213. The remainder of the concentrated oxygen pumped out of portion 28 is directed by valve 215 back into the filter 204 so that the previously filtered nitrogen may be purged through exhaust outlet 207.

By operating in the above manner, concentrator 200 is allowed to rapidly and effectively deliver large amounts of concentrated oxygen to a patient. Because the compressor does not require many moving parts, heat is reduced considerably. For example, sieve beds typically work best at a temperature of approximately 70 degrees Fahrenheit. However, compressors of the prior art may raise that temperature to as high as 100 degrees. Because applicant's device is able to employ a relatively low rpm, the temperature of the filters is maintained at approximately 70 degrees. Additionally, applicant's device eliminates the complex structure and timing required in previous concentrators. The compressor is much lighter weight than previous compressors and therefore allows the concentrator to be transportable, which can be a significant benefit to respiratory patients. By using relatively few moving parts, the apparatus also provides a much quieter operation. Moreover, this compressor may be driven by a direct current, unlike prior compressors which require a standard 60 cycle alternating current. Therefore, apparatus 200 can be taken on trips to various countries having differing power supplies and operated by a battery power supply.

The speed of compressor 12, and therefore the volume of oxygen which is pumped, can be precisely controlled by programming the operation of controller 58. The simplicity of operation and the use of few moving electrical parts reduces considerably the risk of a spark in the presence of oxygen. As a result, this apparatus is much safer to utilize than devices of the prior art.

Although specific features of the invention are shown in some drawings and not others, this is for convenience only, as each feature may be combined with any or all of the other features in accordance with the invention.

Other embodiments will occur to those skilled in the art and are within the following claims:

What is claimed is:

1. A magnetically actuated linear displacement compressor comprising:
   a cylinder;
   a diaphragm mounted for reciprocating movement in said cylinder and dividing said cylinder into two longitudinal portions, said diaphragm including a permanent magnet and means for defining a peripheral edge that sealably engages the inside surface of said cylinder;
   means for introducing gas into and discharging gas from each of said cylinder portions; and
   linear actuator means including a series of at least three windings arranged along said cylinder in at least three non-overlapping groups of at least one said winding per group, each winding including first and second winding segments, said first segment having a first polarity and said second segment having an opposite second polarity, and means for selectively energizing and de-energizing successive said groups of said windings in a sequential pattern to generate a reciprocating magnetic field which drives said diaphragm reciprocally through said cylinder such that gas is alternately drawn into and discharged from one of said cylinder portions, while the reverse sequence occurs in the other said cylinder portion.

2. The device of claim 1 in which each said winding is disposed peripherally about said cylinder.

3. The device of claim 1 in which said first and second segments generally conform to the periphery of said cylinder.

4. The device of claim 1 in which said first and second winding segments are offset longitudinally along said cylinder.

5. The device of claim 1 in which said permanent magnet includes an outer portion that has said first polarity exclusively and an inner portion that has said second polarity.

6. The device of claim 1 in which said permanent magnet has an annular shape.

7. The device of claim 1 in which said diaphragm and said cylinder include circular cross-sectional shapes.

8. The device of claim 1 in which each said winding is arranged generally perpendicularly relative to said longitudinal axis of said cylinder.

9. The device of claim 1 in which said diaphragm and said cylinder include oblong cross-sectional shapes.

10. The device of claim 1 in which said means for introducing and discharging include first means for communicably connecting said first cylinder portion with a first filter and second means for communicably connecting said second cylinder portion with a second filter.

11. The device of claim 9 in which said cylinder includes a pair of opposing longitudinal wall portions, said first winding segment being arranged along one of the wall portions and said second winding segments being arranged along the other of said wall portions, and in which said permanent magnet includes a first side portion extending along the inner periphery of one of said wall portions exclusively and having said first polarity and an opposite second side portion extending along the inner periphery of the other said wall portion exclusively and having said second polarity.

12. An oxygen concentrator apparatus comprising:
   first and second nitrogen filters having respective air inlets;
   a cylinder;
   a diaphragm mounted for reciprocating movement in said cylinder and dividing said cylinder into two longitudinal portions, said diaphragm including a permanent magnet and means defining a peripheral edge that sealably engages the inside surface of said cylinder;
   means for introducing gas into and discharging gas from each of said cylinder portions including first conduit means for communicably connecting said first cylinder portion with said first filter and separate and distinct second conduit means for communicably connecting said second cylinder portion with said second filter;
   linear actuator means including a series of at least three windings arranged along said cylinder in at least three non-overlapping groups of at least one said winding per group, each winding including first and second winding segments, said first segment having a first polarity and said second segment having an opposite second polarity, and means for selectively energizing and de-energizing successive said groups of said windings in a sequential pattern to generate a reciprocating magnetic field which drives said diaphragm reciprocally through said cylinder such that concentrated oxygen is alternately drawn into one said portion of said cylinder from its associated filter and then discharged from said portion, while the reverse sequence occurs in the other said cylinder portion; and means for directing at least a portion of said discharged oxygen to a patient.

13. The apparatus of claim 12 in which each said nitrogen filter includes exhaust means and in which said means for directing includes means for reintroducing a portion of said discharged oxygen into said associated filter to purge filtered nitrogen through said exhaust means.

* * * * *